United States Patent

Kubinski

Patent Number: 5,861,747
Date of Patent: Jan. 19, 1999

[54] MAGNETORESISTIVE ROTARY POSITION SENSOR PROVIDING A LINEAR OUTPUT INDEPENDENT OF MODEST FLUCTUATIONS

[75] Inventor: David John Kubinski, Canton, Mich.

[73] Assignee: Ford Global Technologies, Inc., Dearborn, Mich.

[21] Appl. No.: 863,230

[22] Filed: May 27, 1997

[51] Int. Cl.$^6$ .............................. G01B 7/30; G01R 33/06
[52] U.S. Cl. ............................ 324/207.21; 324/207.25; 338/32 R
[58] Field of Search .......................... 324/207.21, 207.2, 324/207.25, 207.26, 117 R, 252, 207.12; 338/32 R

[56] References Cited

U.S. PATENT DOCUMENTS

| | | | |
|---|---|---|---|
| 5,585,775 | 12/1996 | Ishishita | 324/207.21 |
| 5,621,377 | 4/1997 | Dettmann et al. | 324/252 |

FOREIGN PATENT DOCUMENTS 0101786  5/1988  Japan ................................ 324/207.21

OTHER PUBLICATIONS

1. Article "Oscillatory interlayer coupling and giant magnetoresistance in Co/Cu multilayers", Mosca et al, Journal of Magnetism and Magnetic Materials 94 (1991), pp. L1–L5, North Holland.
2. Article "Oscillatory Magnetic Exchange Coupling through Thin Copper layers", Parkin et al, Physical Review Letters, Apr. 22, 1991, vol. 66, No. 16, pp. 2152–2155.

Primary Examiner—Jay M. Patidar
Attorney, Agent, or Firm—Peter Abolins

[57] ABSTRACT

The measurement of rotary position angle is done using magnetoresistive elements having a combined output which is a linear output that is not affected by a wide range of operating conditions. The magnetoresistive elements are placed on the surface of a cylindrical rod whose axis is perpendicular to the flux lines of a uniform magnetic field.

7 Claims, 3 Drawing Sheets

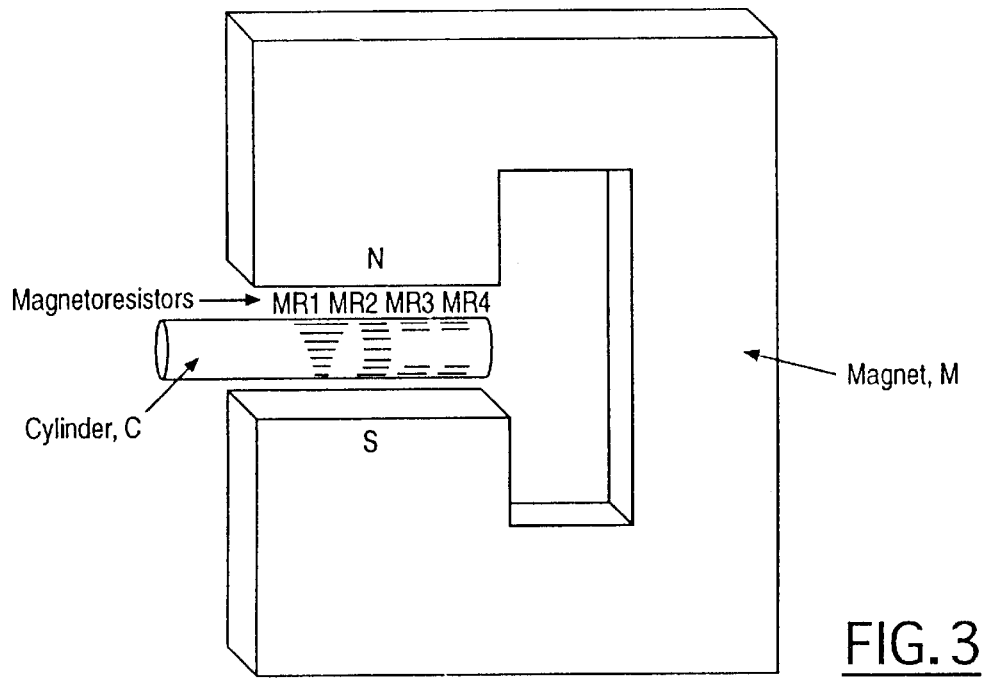
FIG. 3
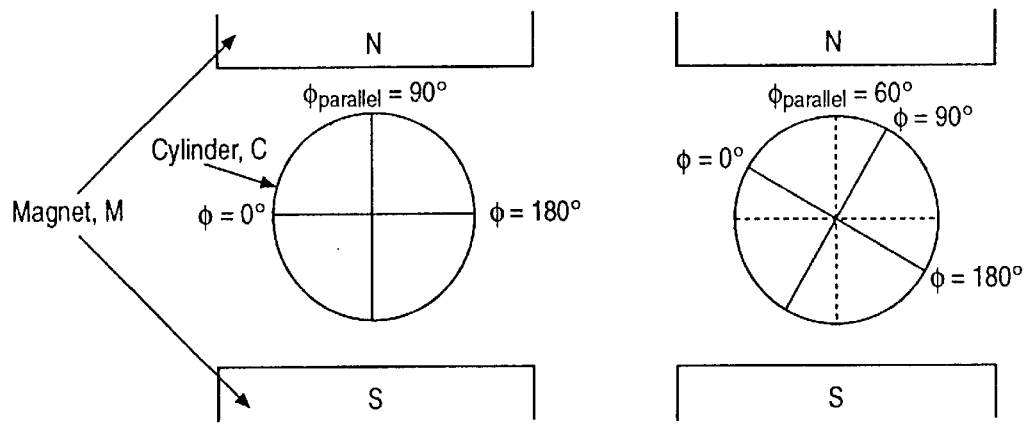
FIG. 4A
FIG. 4B
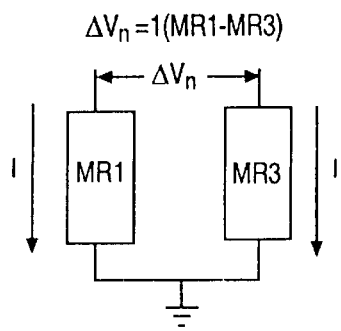
FIG. 6A
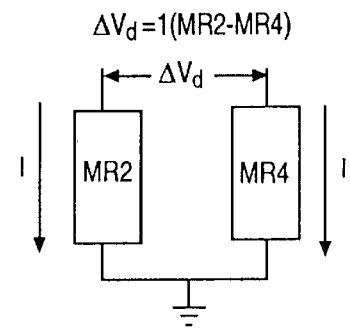
FIG. 6B

MAGNETORESISTIVE ROTARY POSITION SENSOR PROVIDING A LINEAR OUTPUT INDEPENDENT OF MODEST FLUCTUATIONS

BACKGROUND OF THE INVENTION

1. Field of the Invention

This invention relates to measurement of rotary position.

2. Prior Art

Various methods for linear or rotary position sensing are known in various applications. For example, capacitive and inductive position sensors are known.

In one particular application, the movement of a throttle valve in a motor vehicle engine is responsive to the demand of the motor vehicle operator. Preferably, the air/fuel mixture is controlled in response to the throttle position, and numerous sensors for generating a control signal in response to the throttle position have been developed. However, many previously known sensors are contact sensors in which the mechanical movement of the throttle is traced by mechanical displacement of electrical conductors in order to electrically represent the change in throttle positions. Such sensors are subject to mechanical wear that can substantially affect the efficiency and longevity of the electrical conductors and other moving components. Moreover, inherent electrical noise in the output signal limits resolution to a relatively large increment of angular displacement.

For noncontacting magnetic rotary position sensors the magnetic field sensing material is typically either a permalloy magnetoresistor or a Hall effect sensor. The rotary position sensors which use the Hall effect sensor measure the magnitude of the field along a fixed direction. Using rotating permanent magnets and/or flux dividers, this field magnitude is made to vary with rotation angle. Though these sensors can provide a linear output with rotation angle, in typical configurations they are affected directly by variations in permanent magnet strength and by variations in the sensing material, especially with temperature. In its final package, the sensor output is typically calibrated for these effects which increases the cost. The rotary position sensors which use permalloy magnetoresistors can be configured to measure magnetic field direction rather than magnitude. However, in commercially available devices, they provide a linear output over a limited angular range (typically 30°). Throttle angular position measurement must span 90°.

An alternative magnetic sensor for use in angular position monitoring is the large magnetoresistive observed certain metal multilayer films. This effect, referred to as giant magnetoresistance (GMR), was first reported for Fe/Cr multilayer films, and later for Co/Cu multilayer films. FIG. 1 shows the decrease in resistance of a Co/Cu multilayer film for the cases of the field applied in the plane of the film as well as perpendicular to it. With field applied in the plane of a Co/Cu multilayer film, the resistance decreases from a maximum value of $R_{max}$ at zero field and saturates to a minimum value of $R_{sat}$ at $\pm H_{sat}$. A much larger field is required to saturate the resistance when it is applied perpendicular to the film plane. FIG. 2 shows the dependence of the resistance on the angle $\theta$, of a fixed magnetic field, $H_o$, relative to the film plane. Angle $\theta$ is the angle between the plane of any element (i.e., the plane being defined as the surface tangent of the element) and the magnetic field, such that when the field is applied perpendicularly to the plane of the film, such angle equals 90 degrees. Here, the field magnitude is fixed at $H_o=1.5H_{sat}$. When the field is applied perpendicular to the plane of the film, $\theta=90°$, the resistance is at a maximum value $(\approx R_{max})°$. The resistance saturates to a minimum value at $\theta=(90\pm\theta_{max})°$. The width of the R vs $\theta$ curve is dependent on the ratio $H_{sat}/H_o$.

Like the smaller magnetoresistance seen in permalloy, GMR has a practical disadvantage of being temperature dependent. The variation with temperature of $R_{max}$, $R_{min}$, and $H_{sat}$ may require additional calibrations in certain applications. In addition, the resistance change of a typical GMR sensor is linear with field or angle only in limited ranges. To overcome these limitations, this invention uses a normalizing process that provides a linear output over a 90° angular range which is unaffected by small variations in these parameters. Also, a multilayer material and structure are chosen which minimizes the effects of magnetoresistive hysteresis which can be a disadvantage in certain practical applications.

SUMMARY OF THE INVENTION

A device structure measures the rotary position angle and provides a linear output independent of modest fluctuations in temperature, permanent magnet strength, and magnetoresistive properties of the sensing material.

In accordance with an embodiment of this invention a rotary position sensor has four magnetoresistive elements: a first magnetoresistive element, a second magnetoresistive element, a third magnetoresistive element, and a fourth magnetoresistive element. The third and fourth elements have a length, width, and number of elements such that at zero field the third element has the same resistance as the first element and the fourth element has the same resistance as the second element. The first, second, third, and fourth magnetoresistive elements define the rotary position by the ratio of the difference in resistance between the first and third elements divided by the difference in the resistance between the second and fourth elements.

An embodiment of this invention provides the ability to accurately measure rotary position angle with a linear output that is not affected by a wide range of operating conditions. The advantage is a more stable output and reduced calibration requirements. This increases reliability and reduces cost. Accuracy, stability, reliability, and cost reduction are the important attributes for angle position sensors, especially in the application of throttle angle position sensing.

The improvements of this rotary position sensor are as follows. First, an output is linear with respect to rotary positions over a 90° range. Second, an output is independent of small sample to sample variations in the magnetoresistive properties of the sensing material such as $R_{max}$, $R_{sat}$, and $H_{sat}$. Third, an output is independent of small variations in the magnetoresistive properties of the sensing material of an individual sensor with temperature and time. Fourth, an output is independent of small sensor variations in the strength of the permanent magnet $H_o$. Fifth, an output is independent of small variations in the strength of the permanent magnet with temperature and time. Sixth, there is a reduced requirement for calibration due to the increased robustness of the design.

BRIEF DESCRIPTION OF THE DRAWINGS

FIG. 3 is a schematic perspective view of an angular position sensor in accordance with an embodiment of this invention;

FIGS. 4a and 4b are graphical representations of a cross section of a cylinder and a magnet in two rotational positions in accordance with an embodiment of this invention;

FIGS. 6a and 6b are schematics of circuits for obtaining voltages whose ratio is proportional to the angular position of the cylinder.

DETAILED DESCRIPTION OF THE INVENTION

A schematic of the sensor of this invention is shown in FIG. 3. Four magnetoresistors, MR1, MR2, MR3, and MR4, are patterned on the surface of the cylindrical rod, C. The magnetoresistors are made of the same material but have different shapes and different positions on the rod. The permanent magnet or magnetic circuit, M, provides a constant magnetic field of strength $H_o$ in the gap shown. The magnetoresistors on the cylinder surface are placed in the gap of the magnetic circuit such that the axis of the cylinder is at a right angle to the magnetic flux lines. The sensor has two operationally equivalent configurations: either the cylinder rotates about its axis against a fixed magnetic field, or the reverse of this.

The cylinder and the magnet gap are shown in cross-section in FIG. 4a. Points along the cylinder surface cross section are defined by the radial angle $\phi$. The rotary sensor is designed to give an output which is proportional to the radial angle of the surface normal on the cylinder that is parallel to the magnetic field direction. This angle is defined as $\phi_{parallel}$. These angles are defined such that at the midpoint of the rotational range, $\phi_{parallel}$ 90°. This is the configuration shown in FIG. 4a. In FIG. 4b, the rod has been rotated 30° clockwise relative to the position in FIG. 4a, and here $\phi_{parallel}=60°$. The rotary sensor is limited to 90° of rotation and is confined to rotate between $\phi_{parallel}$ 45° and $\phi_{parallel}=135°$. Note that in FIGS. 4a and 4b, the angle $\phi$ has been defined in a clockwise sense. The angle $\phi$ may be equivalently defined in a counter-clockwise sense.

Figure 1:
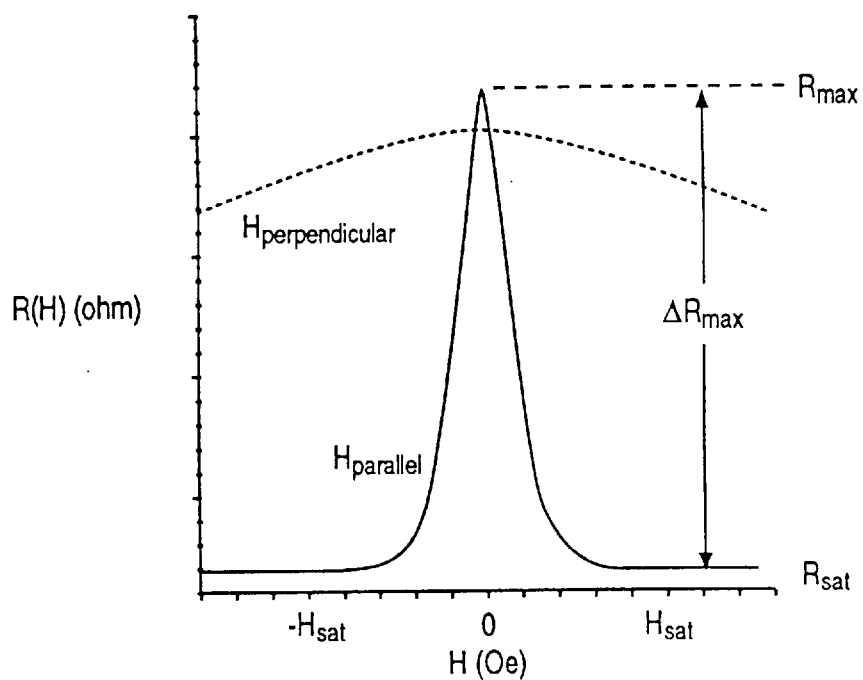
FIG. 1 is a graphical representation of the resistance of a multilayer film as a function of an applied magnetic field, H, for the case of H parallel (solid line) and perpendicular (dotted line) to the film plane.

The four magnetoresistors, MR1, MR2, MR3, and MR4, are all made of the same GMR material. The material and multilayer structure are chosen such that they exhibit magnetoresistive properties similar to those shown in FIGS. 1 and 2. The magnetoresistors are deposited on a flexible substrate, such as a polyimide film, which is then glued to the surface of the rod. In a more elaborate process they can be deposited directly on the rod. The physical layout of each magnetoresistor is a serpentine-like pattern shown in FIGS. 5a, 5b, 5c, and 5d. FIGS. 5a, 5b, 5c, and 5d also show the angular positioning of each resistor on the rod. All of the magnetoresistors have the same film thickness.

MR1 consists of (N+1) parallel elements which are connected in a serpentine-like fashion, N typically larger than 36. The unit resistance of the $i^{-th}$ parallel element is given by $R_i(\phi)$ and is placed at a constant radial angle $\phi_i$ on the cylinder surface. The first element, i=1, is placed at the angle $\phi=0°$. The last element, i=(N+1), is placed at the angle $\phi=180°$. The length of the parallel elements linearly increase with the angle $\phi$, starting with zero length at $\phi=0°$.

MR2 also consists of (N+1) parallel elements that are connected in a serpentine-like fashion, with the $i^{-th}$ parallel element placed at a constant radial angle $\phi_i$ on the cylinder surface. Similar to MR1, the first element, i=1, is also placed at the angle $\phi=0°$, and the last element, i=(N+1), is placed at the angle $\phi=180°$. Note that the length of the parallel elements are constant for all $\phi_i$. The width of the elements in MR2 is the same as in MR1.

MR3 and MR4 are patterned such that the parallel elements of equal length and width are contained within a region of angular range $\pm\alpha°$ about $\phi=0°$ and $\phi=180°$. The parallel elements in each of these magnetoresistors are connected in a serpentine-like fashion. The angle ax must be less than 45° and will typically be approximately 10°–20°. Angle $\alpha$ is chosen such that for all orientational positions of the cylinder the third and fourth elements are saturated by the magnetic field. Ideally, the length, width, and number of elements in both MR3 and MR4 are chosen such that at zero field MR3 has the same resistance as MR1, and MR4 has the same resistance as MR2. This, however, is not essential.

The connections between the parallel magnetoresistive elements which form a single serpentine-like path for each of the four magnetoresistors (N in total for both MR1 and MR2) can be made of the same magnetoresistive material. However, it is preferable to make these connections with as little resistance as possible using an element such as copper, silver, gold, or platinum.

Figure 2:
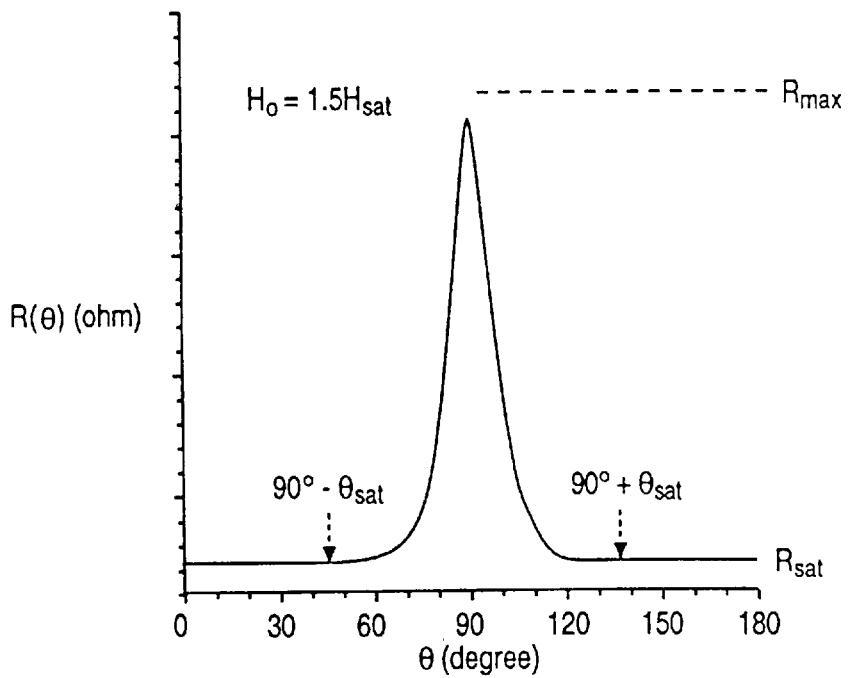
FIG. 2 is a graphical representation of resistance of a multilayer film as a function of the angle, theta ($\theta$), between the direction of a magnetic field of constant magnitude, Ho, and the plane of the film.
Figures 5A, 5B:
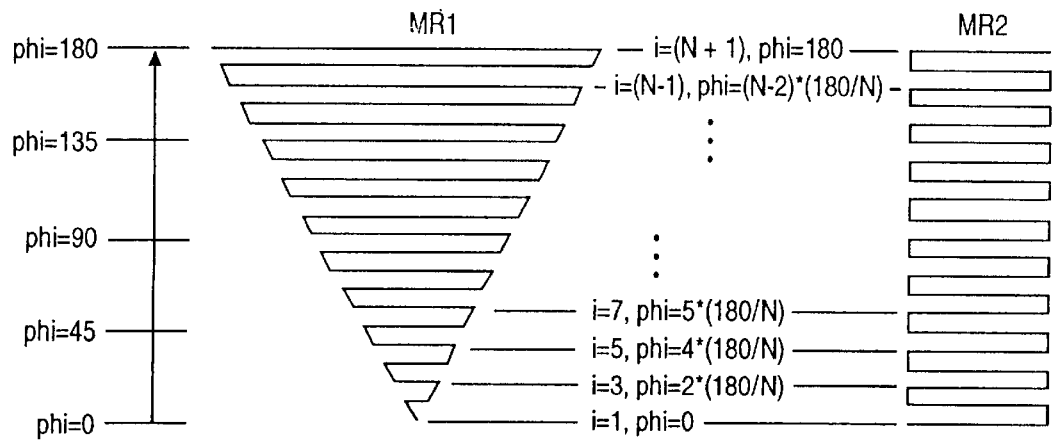
FIGS. 5a, 5b, 5c and 5d are a schematic representations of the physical layout of 4 magneto resistors, MR1, MR2, MR3, and MR4, respectively, with the angular position on the cylinder surface shown at the left.
Figures 5C, 5D:
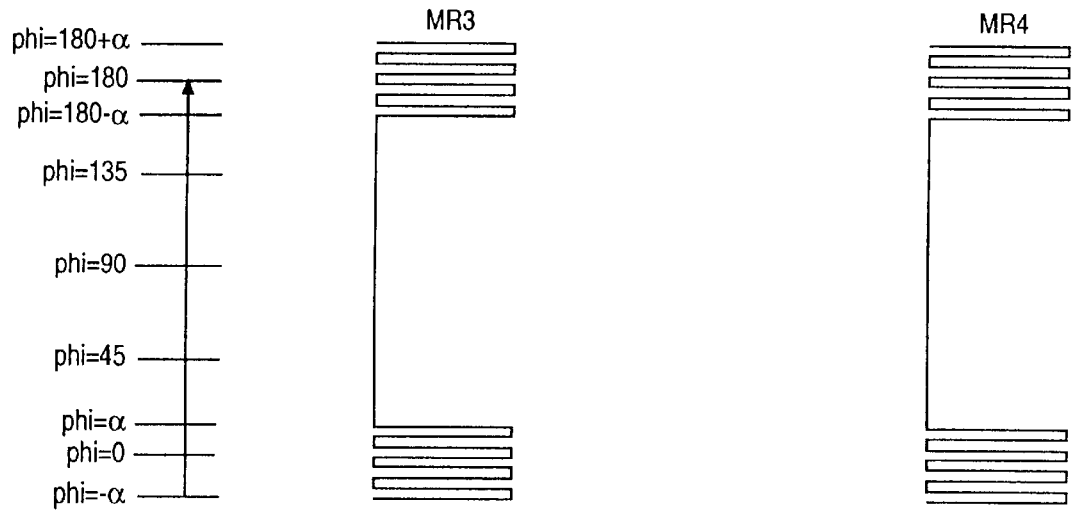

On any of the four magnetoresistors, each of the parallel elements is at an unique angle $\theta$ relative to the magnetic flux lines $(\theta_i=90°+ \{\phi_i-\phi_{parallel}\})$. In a constant magnetic field $H_o$, each parallel element will have a resistance that depends on this angle as is indicated in FIG. 2. The resistance per unit length will be a maximum for the elements whose surface normals are parallel to the magnetic flux lines. In addition, the unit resistance will be at the minimum, $R_{sat}$, for the elements whose surface normals are at an angle greater than $\theta_{sat}$ relative to the flux lines. The angle $\alpha$ and the field magnitude, $H_o$, are chosen such that each unit length of MR3 and MR4 will be saturated at the minimum resistance for all rotational positions of the cylinder in the range $\phi_{parallel}$= 45°→135°. A typical value for $H_o$ would be about 1.5 $H_{sat}$.

If the length, width, and the number of elements in both MR3 and MR4 are chosen such that at zero field MR3 has the same resistance as MR1, and MR4 has the same resistance as MR2, then an output linear in the rotational angle $\phi_{parallel}$, is obtained with the four magnetoresistors by using the simple ratio:

$$\phi_{parallel} = \frac{MR1 - MR3}{MR2 - MR4} \quad \text{(Eq. 1)}$$

A derivation of Eq. 1 is now given. At any given rotational phase of the rod relative to the magnetic field, if $R_i(\phi_i)$ is the resistance per unit length of the $i^{-th}$ elements of MR1 and MR2, then the total resistance for each can be expressed as:

$$MR1 = \Sigma \phi_i R_i (\phi_i), \text{ and} \quad \text{(Eq. 2)}$$

$$MR2 = \Sigma R_i(\phi_i) \quad \text{(Eq. 3)}$$

MR3 and MR4 are positioned on the rod such that in the field, $H_o$, each is saturated at a minimum resistance. Their line width and spacing can be chosen such that in zero magnetic field MR3=MR1 and MR4=MR2. This being the case, in the field $H_o$ they will be numerically equivalent to:

$$MR3 = \Sigma \phi_i R_{sat}, \text{ and} \quad (Eq. 4)$$

$$MR4 = \Sigma R_{sat} \quad (Eq. 5)$$

Thus, $\phi_{parallel}$ is written as:

$$\phi_{parallel} = \frac{MR1 - MR3 = \Sigma_i \phi_i (R_i(\phi_i) - R_{sat})}{MR2 = MR4 \, \Sigma_i (R_i(\phi_i) - R_{sat})} = \frac{\Sigma_i \phi_i (\Delta R_i(\phi_i))}{\Sigma_i \Delta R_i(\phi_i)} \quad (Eq. 6)$$

An output linear in the rotation angle $\phi_{parallel}$ is obtained with the four magnetoresistors by using this simple ratio.

Figure 7:
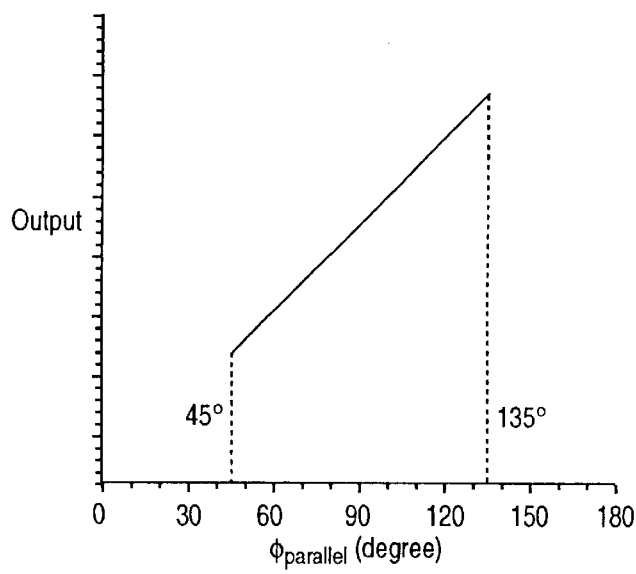
FIG. 7 is a graphical representation of sensor voltage output as a function of the angular position of the cylinder.

Simple circuit diagrams are shown in FIGS. 6a and 6b, demonstrating how the numerator and denominator terms in Eq. 1 can be obtained. The output, which is obtained by taking the ratio of these two voltages, is shown in FIG. 7 as a function of the angle $\phi_{parallel}$. The description of operation given so far has had MR3=MR1 in zero field. This, however, is not essential. The voltage drop across MR3 seen in the circuit diagram in FIG. 6 can be amplified to give the same voltage drop as that across MR1 when both are in zero magnetic field. The same is also true for MR4 and MR2.

Various modifications and variations of the invention disclosed herein will no doubt occur to those skilled in the art to which this invention pertains. Such variations and modifications which are taught by the disclosure of this invention are properly considered with the scope of the appended claims.

I claim:

1. A rotary position sensor having four magnetoresistive elements, a first magnetoresistive element, a second magnetoresistive element, a third magnetoresistive element and a fourth magnetoresistive, element;

said third and fourth elements having a length, width and number of elements such that at zero field the third element has the same resistance as the first element and the fourth element has the same resistance as the second element; and said first, second, third and fourth magnetoresistive elements further being characterized as defining the rotary position by the ratio of the difference in resistance between the first and third elements divided by the difference in the resistance between the second and fourth elements.

2. A rotary position sensor as recited in claim 1 wherein:

said first element is elongated and has a serpentine configuration, with a constant width and thickness along the length of the said first element, a constant spacing between parallel serpentine configuration element portions, and a length of a serpentine configuration segment which increases linearly with angular position;

said second element having a serpentine configuration and having a constant width and thickness along the length of the said second element, a constant spacing between parallel serpentine configuration element portions, and a constant length of parallel serpentine configuration element portions;

said third element being elongated and having a serpentine configuration and being positioned on the cylinder such that the resistance of each of the parallel serpentine configuration element portions including the serpentine pattern is saturated to its minimum value by the magnetic field; and said fourth element being elongated and having a serpentine configuration and being positioned on the cylinder such that the resistance of each of the parallel serpentine configuration element portions including the serpentine pattern is saturated to its minimum value by the magnetic field.

3. A rotary position sensor as recited in claim 2 wherein said third element and said fourth element are patterned such that the parallel elements of equal length and width are contained within a region of angular range $\pm \alpha°$ about $\phi=0°$ and $\phi=180°$, where $\phi$ defines the rotational position of an element on the substantially cylindrical surface, the parallel elements in each of these magnetoresistors being connected in a serpentine-like fashion.

4. A rotary position sensor as recited in claim 3 wherein angle $\alpha$ is chosen such that for all orientational positions of the cylinder the third and fourth elements are saturated by the magnetic field.

5. A rotary position sensor as recited in claim 4 further comprising:

a voltage sensing means for obtaining a first and a second voltage whose ratio is proportional to the rotary angle position, the first voltage being the difference in voltage between the first and the third element, and the second voltage being the difference in voltage between the second and the fourth element.

6. A rotary position sensor having three magnetoresistive elements positioned on a generally cylindrical surface in a substantially uniform magnetic field, the axis of the cylindrical surface being perpendicular to the flux lines of the uniform magnetic field, a first magnetoresistive element, a second magnetoresistive element, and a third magnetoresistive element;

said third element having a length, width and number of elements such that at zero field and with an equivalent constant current passing through the elements, the voltage drop across of the third element can be amplified by f1 to give the equivalent voltage drop across the first element and using a second amplification, f2, the amplified voltage drop across the third element is equivalent to the voltage drop across the second element; and said first, second and third magnetoresistive elements further being characterized as defining the rotary position by the ratio of the difference in resistance between the first element and f1 multiplied by the third element divided by the difference in the resistance between the second element and f2 multiplied by the resistance of the third element.

7. A rotary position sensor having four magnetoresistive elements positioned on a generally cylindrical surface in a substantially uniform magnetic field, the axis of the cylindrical surface being perpendicular to the flux lines of the uniform magnetic field, a first magnetoresistive element, a second magnetoresistive element, a third magnetoresistive element, and a fourth magnetoresistive element;

said third and fourth elements having a length, width and number of elements such that at zero field the third element has the same resistance as the first element and the fourth element has the same resistance as the second element;

said first, second, third, and fourth magnetoresistive elements further being characterized as defining the rotary position by the ratio of the difference in resistance between the first and third elements divided by the different in the resistance between the second and fourth elements;

said first element being elongated and having a serpentine configuration, with a constant width and thickness along the length of the said first element, a constant spacing between parallel serpentine configuration element portions, and a length of a serpentine configuration segment which increases linearly with angular position;

said second element having a serpentine configuration and having a constant width and thickness along the length of the said second element, a constant spacing between parallel serpentine configuration element portions, and a constant length of parallel serpentine configuration element portions;

said third element being elongated and having a serpentine configuration and being positioned on the cylinder such that the resistance of each of the parallel serpentine configuration element portions including the serpentine pattern is saturated to its minimum value by the magnetic field;

said fourth element being elongated and having a serpentine configuration and being positioned on the cylinder such that the resistance of each of the parallel serpentine configuration element portions including the serpentine pattern is saturated to its minimum value by the magnetic field;

a voltage sensing means for obtaining a first and a second voltage whose ratio is proportional to the rotary angle position, the first voltage being the difference in voltage between the first and the third element, and the second voltage being the difference in voltage between the second and the fourth element;

said third element and said fourth element being patterned such that the parallel elements of equal length and width are contained within a region of angular range $\pm\alpha°$ about $\phi=0°$ and $\phi=180°$, where $\phi$ defines the rotational position of an element on the substantially cylindrical surface, the parallel elements in each of these magnetoresistors being connected in a serpentine-like fashion, wherein angle a is chosen such that for all orientational positions of the cylinder the third and fourth elements are saturated by the magnetic field.

* * * * *